June 28, 1932.　　S. JOHNSON, JR., ET AL　　1,865,110
TIRE INFLATION DEVICE
Filed Sept. 3, 1930
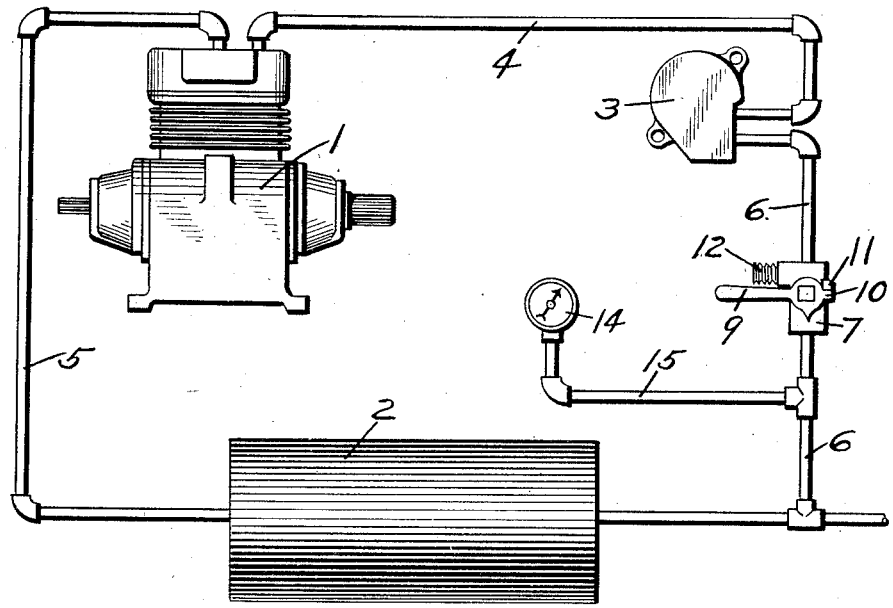
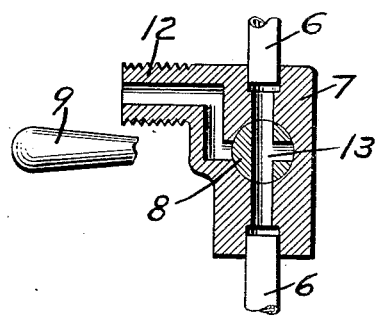
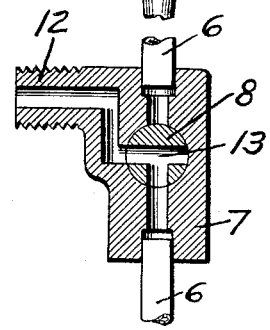
*INVENTORS*
STEPHEN JOHNSON, JR
RAYMOND L. MORRISON
BY AND ARTHUR R. LEUKHARDT
Wm. M. Cady
*ATTORNEY*

Patented June 28, 1932

1,865,110

UNITED STATES PATENT OFFICE

STEPHEN JOHNSON, JR., OF PITTSBURGH, PENNSYLVANIA, AND RAYMOND L. MORRISON AND ARTHUR R. LEUKHARDT, OF DETROIT, MICHIGAN, ASSIGNORS TO THE WESTINGHOUSE AIR BRAKE COMPANY, OF WILMERDING, PENNSYLVANIA, A CORPORATION OF PENNSYLVANIA

TIRE INFLATION DEVICE

Application filed September 3, 1930. Serial No. 479,506.

This invention relates to a device for inflating tires on motor vehicles, and is more particularly adapted for use in connection with a fluid compressing apparatus including a fluid compressor, a storage reservoir into which the compressor compresses fluid, and a governor adapted to unload the compressor, when the pressure in the reservoir has been increased to a predetermined degree.

Fluid compressing apparatus of the above character is applied to motor vehicles, more particularly to provide a supply of fluid under pressure for operating the brakes on the vehicle. The maximum pressure of fluid maintained in the reservoir is limited by operation of the governor and while ample for braking purposes, may not be high enough for use in connection with the inflation of the vehicle tires.

The principal object of our invention is to provide a tire inflating means adapted to be associated with a fluid compressing apparatus of the above character, in which the governor is cut out of action when the operator uses the apparatus for the purpose of inflating tires, so that when tires are being inflated, the compressor continues to operate to increase the pressure in the storage reservoir, and thus a higher than normal fluid pressure is available for tire inflating purposes.

Other objects and advantages will appear in the following more detailed description of the invention.

In the accompanying drawing; Fig. 1 is a diagrammatic view of a motor vehicle fluid compressing equipment, showing our invention applied thereto; Fig. 2 a sectional view of the controlling cock employed in the equipment shown in Fig. 1, with the cock valve in the normal position; and Fig. 3 a sectional view of the controlling cock, with the cock valve in the position for inflating tires.

As shown in Fig. 1, the equipment may comprise a fluid compressor 1, a main or storage reservoir 2, and an unloader governor 3.

The unloader governor 3 is connected by pipe 4 to the compressor 1, and the compressor supplies fluid under pressure, through pipe 5 to the reservoir 2. A pipe 6 connects the reservoir 2 with the governor 3, which is of the well known type adapted to control an unloading means (not shown) associated with the compressor 1, by varying the pressure of fluid in pipe 4.

A controlling cock device is interposed in pipe 6 and may comprise a valve body 7 in which is mounted a plug cock or valve 8. The valve 8 is provided with an operating handle 9. The handle 9 is provided with a tang 10 which is adapted to engage a lug 11 on the body 7, so positioned that with the handle 9 in the horizontal position, as shown in Fig. 1, the handle will be prevented from moving out of this position by jarring, through the engagement of the tang 10 with the lug 11.

The valve body 7 is provided with a nipple 12 to which a flexible hose may be attached, when it is desired to inflate tires. The valve 8 is provided with a three-way port 13 adapted when the handle 9 is in the horizontal position as shown in Fig. 2, to establish communication through pipe 6 from the reservoir 2 to the governor 3, and when the handle 9 is raised to the vertical position, as shown in Fig. 3, to connect the reservoir side of pipe 6 to the nipple 12, while cutting off communication from the reservoir side of pipe 6 to the governor side of pipe 6.

A pressure indicating gauge 14 may be connected through pipe 15 to pipe 6 between the reservoir 2 and the cock device 7, so that the pressure in the reservoir 2 will be indicated on the gauge at all times, regardless of the position of the controlling cock.

In operation, with the cock handle 9 in the position shown in Fig. 2, communication is established through pipe 6 from the reservoir 2 to the governor 3. With the compressor 1 running, fluid is compressed by the compressor into the reservoir 2, and when the pressure in the reservoir has been increased to the predetermined degree at which the governor 3 is adjusted, the governor 3 operates to vary the fluid pressure supplied through pipe 4 to the unloading means associated with the compressor, so that the compressor is unloaded and ceases to compress fluid into the reservoir.

When the pressure of fluid in the reservoir 2 falls below a predetermined degree, the governor 3 operates to vary the fluid pressure supplied through pipe 4 to the unloading means of the compressor, so that the compressor is loaded and operates to again compress fluid into the reservoir.

If it is desired to inflate tires, the handle 9 is turned upwardly to the vertical position shown in Fig. 3, so that fluid under pressure is supplied from the reservoir 2 to the nipple 12. At the same time, communication through pipe 6 from the reservoir 2 to the governor 3 is cut off, so that the governor 3 is not subject to the pressure of fluid in the reservoir 2 and consequently does not act to unload the compressor. As a result, the compressor continues to operate to compress fluid into the reservoir 2, so long as the handle 9 remains in its vertical position, and thus a higher than normal pressure is obtained in the reservoir at the time fluid under pressure is being supplied to inflate tires.

While one illustrative embodiment of the invention has been described in detail, it is not our intention to limit its scope to that embodiment or otherwise than by the terms of the appended claims.

Having now described our invention, what we claim as new and desire to secure by Letters Patent, is:

1. The combination with a fluid compressor, a reservoir into which said compressor compresses fluid, and a governor for controlling the operation of said compressor according to the pressure of fluid in the reservoir, of a cock device for controlling the supply of fluid under pressure from said reservoir to an outlet and operative to cut the governor out of action when in position to supply fluid to said outlet.

2. The combination with a fluid compressor, a reservoir into which said compressor compresses fluid, and a governor operated at a predetermined increase in pressure in said reservoir for preventing said compressor from increasing the pressure in the reservoir, of a cock device having a position for supplying fluid under pressure from said reservoir to an outlet and operative in said position to prevent said governor from acting.

3. The combination with a fluid compressor, a reservoir into which said compressor compresses fluid, and a governor subject to the pressure of fluid in said reservoir and operative to effect the unloading of the compressor upon a predetermined increase in reservoir pressure, of a cock device for controlling communication through which fluid under pressure is supplied to the governor and having a position in which fluid under pressure is supplied from the reservoir to an outlet and in which said communication is cut off.

4. The combination with a fluid compressor, a reservoir into which said compressor compresses fluid, and a governor subject to the pressure of fluid in said reservoir and operative to effect the unloading of the compressor upon a predetermined increase in reservoir pressure, of a manually operable cock device having one position in which communication is established for supplying fluid under pressure from said reservoir to the governor and another position in which said reservoir is connected to an outlet and said communication is cut off.

In testimony whereof we have hereunto set our hands, signed by STEPHEN JOHNSON, Jr., on the 28th day of August, 1930, and by RAYMOND L. MORRISON and ARTHUR R. LEUKHARDT on the 25th day of August, 1930.

STEPHEN JOHNSON, JR.
RAYMOND L. MORRISON.
ARTHUR R. LEUKHARDT.